Figure 1:
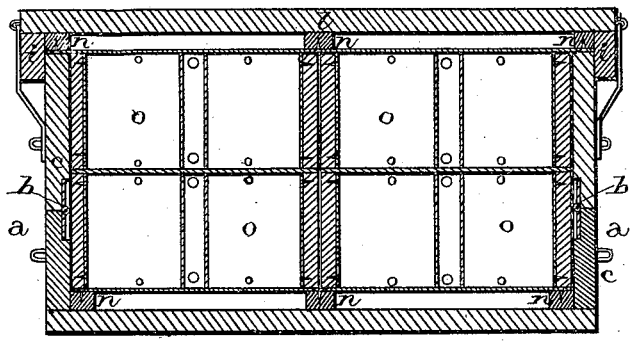
Figure 2:
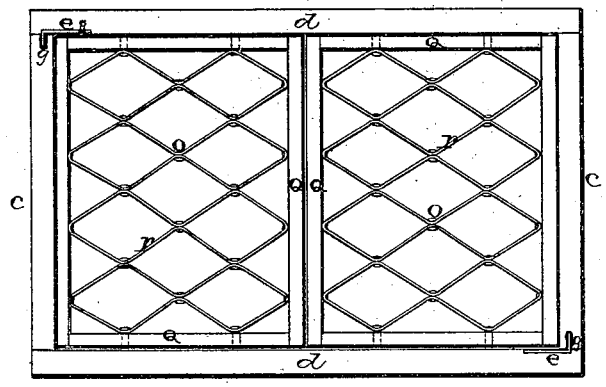
Figure 3:
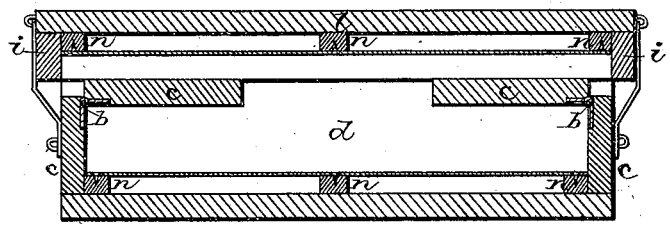
Figure 4:
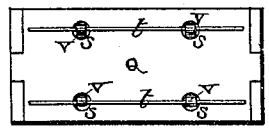
Figure 6:
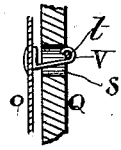
Figure 5:

R. R. WILKINSON.
Egg-Carrier.

No. 199,339. Patented Jan. 15, 1878.

WITNESSES
J. Wm Garner
O. S. D. Haines

INVENTOR
R. R. Wilkinson
per
F. A. Lehmann, Atty

UNITED STATES PATENT OFFICE.

ROBERT R. WILKINSON, OF JAMESTOWN, MICHIGAN.

IMPROVEMENT IN EGG-CARRIERS.

Specification forming part of Letters Patent No. 199,339, dated January 15, 1878; application filed December 15, 1877.

*To all whom it may concern:*

Be it known that I, ROBERT R. WILKINSON, of Jamestown, in the county of Ottawa and State of Michigan, have invented certain new and useful Improvements in Egg-Carriers; and I do hereby declare the following to be a full, clear, and exact description of the invention, such as will enable others skilled in the art to which it pertains to make and use it, reference being had to the accompanying drawings, which form part of this specification.

My invention relates to an improvement in egg-carriers; and it consists in the arrangement and combination of parts, which will be more fully described hereinafter, whereby the box and the sections for holding the eggs are made to fold up and occupy a much smaller amount of space when being shipped empty than when full.

It also consists in making the partitions by which the eggs are kept in position by the sections of cloth in a peculiar manner of fastening the cloth sections.

The accompanying drawings represent my invention.

$a$ represents a rectangular box in which the eggs are packed for transportation. In order to reduce the freight upon these boxes in shipping them back home after the eggs have been taken out, both the sides and the ends of the boxes are divided near their centers, and then joined together by means of the hinges $b$, or any other suitable fastening devices. Either the ends $c$ or the sides $d$ are divided upon a line lower down than the other two, so that when it is desired to fold the box up for the purpose of decreasing it in size, either the ends or the sides may be first folded inward, and then the other two parts folded down upon them. In this way the sides and ends may be folded inward, as shown, without interfering with each other in the slightest manner.

When the sides and ends are raised in position, as they should be for transportation of the eggs, they are held securely in place by means of the pivoted catches $e$, which are secured to either the ends or the sides, at the corners, and have their outer ends bent at right angles, so as to catch in a slot or groove, $g$.

When the cover $l$ is placed over the top of the box, the flanges $i$ around its sides and ends catch over the tops of these removable portions, and lock them securely in place.

In order to prevent the eggs from being broken by resting against either the inside of the top or upper side of the bottom of the box $a$, a number of strips, $n$, are nailed to the inside of the top and upper side of the bottom, and then over these strips are tightly stretched sheets of canvas or other suitable elastic material, against which the eggs will strike. As this canvas is elastic, and as the eggs are quite light, it will be almost impossible for an egg to be broken by striking against the cushion thus prepared for them.

The different sections $o$, in which the eggs are directly placed for transportation, are also intended to be folded up, so that they may be packed in the box when it is folded up, as already described, and thus reduce the size of the carrier or crate, when empty to about one-half the size of what it is when it is full.

The different compartments in each section in which the eggs are to be placed are formed entirely of strips of cloth, $r$, which are secured together by suitable metallic or other fastenings, as shown, whereby they are fastened together throughout, and the diamond-shaped compartments formed the same as in common carriers.

The frames Q of the sections $o$ are formed of four separate and distinct pieces, to the sides of which the strips of cloth or other suitable flexible material are rigidly fastened at their ends, while the end pieces have a number of holes, $s$, formed through them, near both of their top and bottom edges. Extending along the edges of these holes, securely fastened in position, are the wires $t$, over which the metallic fastenings $v$ catch, after their outer ends have been passed through the holes from the inside. These metallic fastenings $v$ are secured to the cloth at considerable distances apart, and then their outer ends are hook-shaped, so that after they have once caught hold of the wires they will remain in position.

After these hooks, or other equivalent fastenings, have been loosened, the end pieces can be entirely removed, and the sides will close in upon the cloth, and thus occupy but a very small space. After the sections have thus been closed together they can be packed in the box, when it is closed up, and thus the box can be returned home as freight, occupying not more than about half the space it does when sent away full of eggs.

After the lower sections in the boxes have been filled with eggs, strips of pasteboard are placed upon their tops, and the top sections placed upon the top of the pasteboard.

After long experience in shipping and handling eggs I have discovered that the usual pasteboard crates are little better than the old way of packing and shipping them, owing to the fact that the surfaces against which the eggs rest are too hard and possess too little elasticity. For this reason I have put a cloth or other soft elastic bearing-surface upon at least three sides, for the eggs to bear against, and thus overcome entirely the defects above mentioned.

Having thus described my invention, I claim and desire to secure by Letters Patent—

1. The combination of the strips $r$, provided with the hooks $v$, in combination with the end pieces having the holes $s$ and wires $t$, substantially as shown.

2. The egg-sections Q, having removable ends, that are adapted to be fastened to the cloth sections, substantially as set forth.

In testimony that I claim the foregoing I have hereunto set my hand this 4th day of December, 1877.

ROBERT R. WILKINSON.

Witnesses:
CHARLES DEWEY,
CHAS. A. O'DELL.